L. F. PERKETT.
INCUBATOR.
APPLICATION FILED APR. 1, 1915.

1,190,795.

Patented July 11, 1916.
2 SHEETS—SHEET 1.

Witnesses:
Chas. Koursh.

Inventor
Louis F. Perkett

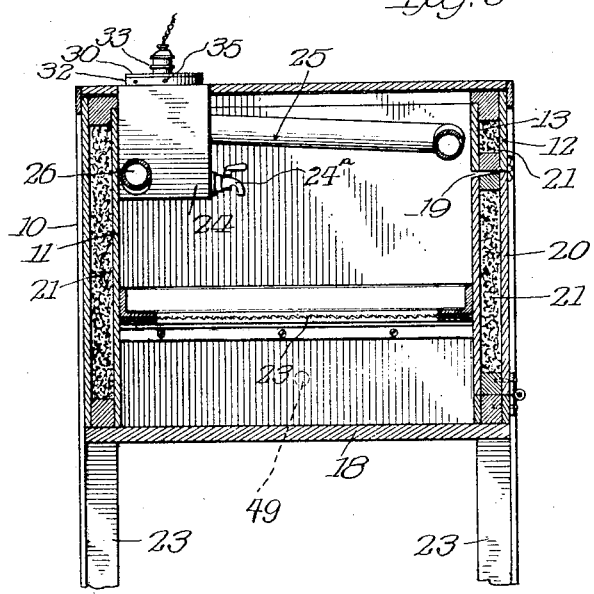
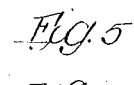
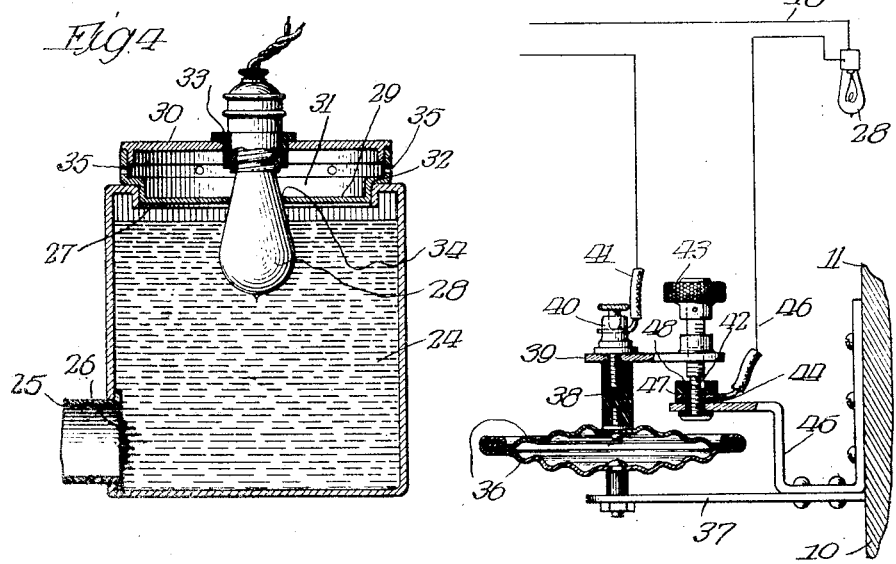

UNITED STATES PATENT OFFICE.

LOUIS F. PERKETT, OF TRAVERSE CITY, MICHIGAN.

INCUBATOR.

1,190,795. Specification of Letters Patent. Patented July 11, 1916.

Application filed April 1, 1915. Serial No. 18,437.

*To all whom it may concern:*

Be it known that I, LOUIS F. PERKETT, a citizen of the United States, residing at Traverse City, in the county of Grand Traverse and State of Michigan, have invented certain new and useful Improvements in Incubators, of which the following is a specification.

This invention relates to improvements in incubators and one of the objects of the same is to provide an improved device of this character having means whereby the necessary heat is obtained by hot water circulation, the heat for heating the water being supplied from an electric lamp or other electric element, the element or the lamp circuit being automatically controlled by means of a thermostat.

A further object is to provide an improved device of this character, having its walls constructed of fiber board and properly insulated, resulting in a light, durable and cheap construction, which will be effective and efficient in operation.

To the attainment of these ends and the accomplishment of other new and useful objects as will appear, the invention consists in the features of novelty in substantially the construction, combination and arrangement of the several parts hereinafter more fully described and claimed, and shown in the accompanying drawing illustrating the invention, and in which—

Figure 1:
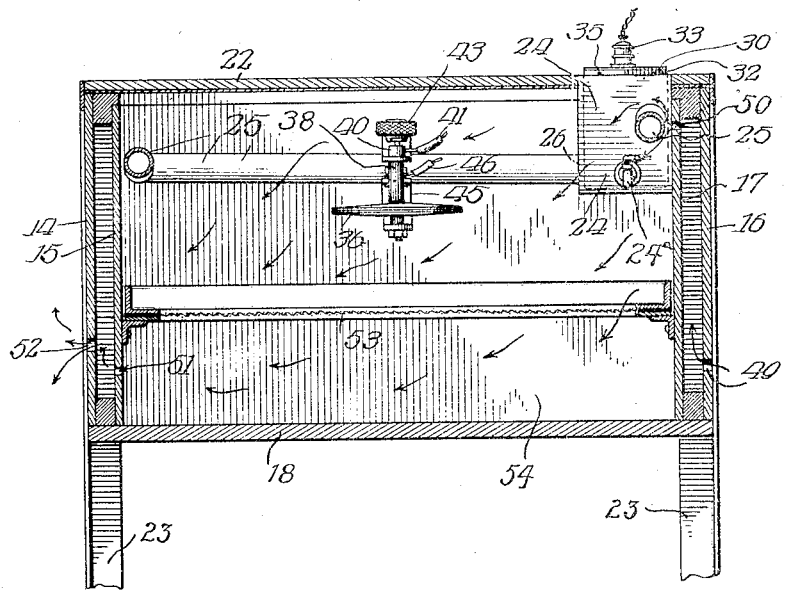
Figure 2:
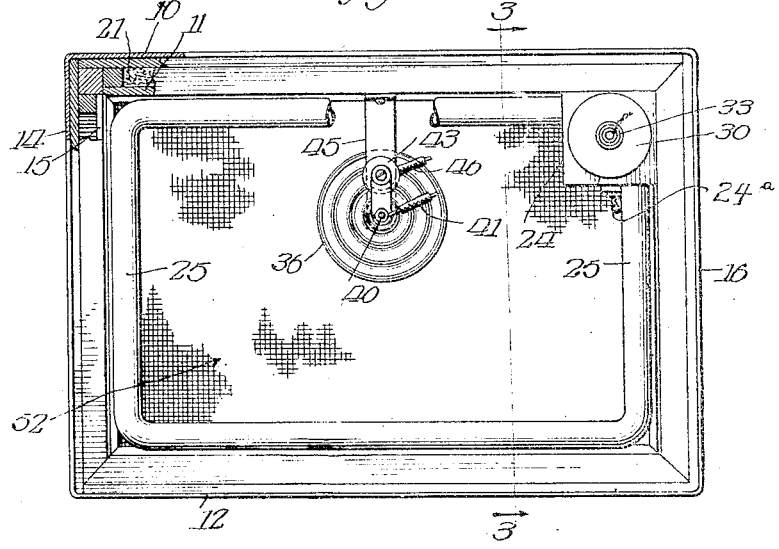

Figure 1 is a vertical longitudinal sectional view of an improved device of this character, constructed in accordance with the principles of this invention. Fig. 2 is a top plan view of the parts shown in Fig. 1 with the top or cover removed. Fig. 3 is a sectional view taken on line 3—3, Fig. 2. Fig. 4 is an enlarged detail sectional view of the water tank. Fig. 5 is an enlarged detail view partly in elevation and partly in section of the thermostat control.

Referring more particularly to the drawings, the incubator body comprises spaced rear walls 10, 11, spaced front walls 12, 13 and spaced end walls 14, 15, 16 and 17, all constructed of fiber board and are held spaced by suitable spacing means and the body thus formed is closed by a suitable bottom 18.

Through the spaced front walls is a door opening 19, adapted to be closed by a suitable closure 20, the latter being formed by spaced walls, constructed of fiber board and insulating material 21 is arranged within the space. Similar insulating material 21 is also provided between the spaced front and rear walls to thoroughly insulate the casing. The top of the casing thus formed is preferably open and provided with a removable cover 22, which may be removably secured in position in any suitable manner and the casing may be supported by means of suitable legs 23.

The incubator is heated by water circulation, and for that purpose there is provided a tank 24 of any suitable and convenient size, which is preferably arranged in one corner of the casing and adjacent the top thereof, and is supported in any suitable manner. Leading from the tank 24 adjacent the upper part thereof, is an outlet pipe 25 which extends along the walls of the chamber and inclines downwardly as it advances, so that its outlet end 26 enters the tank at a much lower level or adjacent the bottom thereof, so as to induce circulation, the warmer water passing into the pipe 25 at a point adjacent the top of the tank and then flows back into the tank.

The top of the tank 24 is open as at 27, and the water is heated by means of an incandescent lamp 28, the latter being inserted into the water as shown in Fig. 4. The lamp is supported by a cover for the open portion of the tank and this cover is preferably constructed of two elements 29, 30, which are held spaced from each other, to form a chamber 31 therebetween. The element 29 is formed with a circumferential seat 32, adapted to engage the edge of the open portion of the tank so that when the cover is placed in position, it will be frictionally held. The element 30 is provided with a socket 33 for the lamp, while the element 29 is provided with an opening 34 arranged in alinement with the socket. By this means, the lamp 28, which may be of an ordinary sixteen candle power, is inserted through the opening 34 so that its end will engage in the socket 33, and when the lamp is screwed in the socket, the lamp will engage the wall of the opening 34 and serve to draw the two elements 29, 30 together and hold them against separation. With this construction it will be manifest that when it is desired to fill the tank all that is necessary is to remove the cover and the lamp will be removed with the cover.

The chamber 31 between the elements 29, 30, is provided with a series of outlet openings 35, so as to permit any vapor which may be formed along the wall of the lamp and which enters the chamber 31 to escape into the atmosphere, the lamp fitting the opening sufficiently to permit the vapor which may be formed on the lamp to pass from the tank into the chamber 31.

The cover or top of the incubator 22, is so positioned that access may be readily had to the cover of the tank and the lamp without removing the cover 22.

In order to automatically control the circuit of the lamp, a thermostat is provided, and in the present form of the invention, the thermostat comprises the disks 36 which are supported by a bracket 37 secured to the wall 10 of the incubator. An insulating post 38 is connected with one of the disks 36 and this post supports a metallic plate or arm 39, having connected with it a binding post 40 to which the conductor 41 is secured. The plate or element 39 supports an adjustable contact point 42, adapted to be adjusted by means of a thumb nut 43. Another contact 44 which coöperates with the contact 43, is supported by a bracket 45 and to the contact 44 is connected a conductor 46 which leads to the lamp 28, while another conductor 46ª, leads from the line to the lamp. Thus it will be seen that when the contacts 42, 44 are in engagement, the circuit will be completed through the lamp 28 to heat the water in the tank, but when the temperature in the incubator rises to expand or adjust the disks 36 sufficiently to separate the contacts 42, 44, the lamp circuit will be broken and the light extinguished. When the temperature lowers sufficiently the disks 36 will contract and the contacts 42, 44 will be again brought into contact to complete lamp circuit.

In order to thoroughly insulate the contact points 42, 44, and to protect them as well as the incubator, there is provided an insulating element 47, which is provided with a recess or hollow portion 48 into which the contacts 42, 44 project, and within which portion the contact is made.

With this improved construction it will be manifest that a light structure will not only result, but it will be absolutely fireproof and with this construction, it is also possible to heat the water sufficiently with a single sixteen candle power lamp and no fumes, gases or odors will be present, inasmuch as the heating is accomplished by means of hot water circulation.

To ventilate the incubator, the end wall 16 is provided with one or more openings 49 adjacent the bottom thereof, which permits outside air to enter the space between the walls 16, 17 and the wall 17 is provided with one or more passages 50 forming communication between the space between the walls and the inside of the incubator, adjacent the top thereof, and also adjacent the water circulation pipe 25. The opposite wall 15 is provided with one or more openings 51 adjacent the bottom thereof, forming communication between the interior of the incubator and the space between the walls 14 and 15, while the wall 14 is provided with one or more openings 52 therethrough arranged out of alinement with the openings 51. Thus the air will enter the opening 49, flow through the space between the walls 16, 17 into the incubator and through the openings 50, around the pipe 25 and circulate through the incubator to the opposite side thereof and through the openings 51 into the space between the walls 14, 15 and out of the openings 52, thereby insuring perfect ventilation of the incubator.

An egg tray 53 is removably supported within the incubator above the bottom thereof so as to form a chamber 54 beneath the tray, and the chamber 54 and tray are both accessible through the opening 19 when the closure 20 is open. A drawoff cock 24ª is provided for the tank 24.

What is claimed as new is:

1. In an incubator, the combination of a water circulation tank, water circulation pipes connected with the tank and extending about the incubator, and an electric vacuum heating element supported by the tank for free removal and extending into the tank and immersed in the water therein for heating the latter.

2. In an incubator a water tank, circulation pipes having communication therewith, said tank having an opening through its top, a vacuum heating element adapted to extend into the tank through said opening, and immersed in the water therein and a support for removably holding the said element in position.

3. In an incubator a water tank, circulation pipes having communication therewith, said tank having an opening through its top, a cover for the tank, said cover embodying spaced elements, and a vacuum heating element supported by the cover to extend into the tank, said cover elements being held assembled by the said heating element.

4. In an incubator a water tank, circulation pipes having communication therewith, said tank having an opening through its top, a hollow cover for the tank, a vacuum heating element supported by the cover to extend into the tank, said element passing through one wall of the cover and engaging the opposite wall thereof, and vent openings leading through the wall of the cover outside of the tank.

5. In an incubator a water tank, circulation pipes having communication therewith, said tank having an opening through its top, a cover for the tank, said cover comprising spaced elements, a socket connected with one of the elements, the other element having an opening therethrough in alinement with the socket, and an electric lamp passing through the opening in one cover element and engaging the socket on the other cover element to draw the cover elements together, said lamp projecting from the cover and extending into the tank.

6. In an incubator a water tank, circulation pipes having communication therewith, said tank having an opening through its top, a cover for the tank, said cover comprising spaced elements, a socket connected with one of the elements, the other element having an opening therethrough in alinement with the socket, an electric lamp passing through the opening in one cover element and engaging the socket on the other cover element to draw the cover elements together, said lamp projecting from the cover and extending into the tank, and vent openings leading from the space between the cover elements.

7. In an incubator a water tank, circulation pipes having communication therewith, said tank having an opening through its top, a cover for the tank, said cover comprising spaced elements, a socket connected with one of the elements, an electric lamp engaging the socket and also having engagement with the other cover element to draw the cover elements together, said lamp projecting from the cover and extending into the tank, a lamp circuit and thermostatic means for controlling the lamp circuit.

8. In an incubator, a water tank, circulation pipes communicating therewith, said tank having an open top, a cover for the top frictionally held in position, an electric lamp arranged perpendicular to the cover to extend into the tank to heat the water therein, a lamp circuit, thermostatic means for controlling the circuit, and a vapor outlet leading from the tank through the cover and to the outside of the incubator.

In testimony whereof I have signed my name to this specification, in the presence of two subscribing witnesses, on this 27th day of March A. D. 1915.

LOUIS F. PERKETT.

Witnesses:
LETEY E. MARTIN,
CLAUDIA M. PETERSON.